United States Patent [19]

Cangialosi

[11] Patent Number: 4,534,648
[45] Date of Patent: Aug. 13, 1985

[54] GYRO SENSOR BLOCK SUSPENSION
[75] Inventor: Arthur D. Cangialosi, Wayne, N.J.
[73] Assignee: The United States of America as represented by the Secretary of the Navy, Washington, D.C.
[21] Appl. No.: 549,019
[22] Filed: Nov. 7, 1983
[51] Int. Cl.³ .............................................. G01C 19/64
[52] U.S. Cl. ................................................... 356/350
[58] Field of Search ......................................... 356/350
[56] References Cited

U.S. PATENT DOCUMENTS

| 3,479,888 | 11/1969 | Litman et al. | 74/5.5 |
|---|---|---|---|
| 3,784,363 | 1/1974 | Flannelly | 74/5.34 |
| 4,085,825 | 4/1978 | Scarborough | 356/350 X |
| 4,115,004 | 9/1978 | Hutchings et al. | 356/350 |
| 4,190,364 | 2/1980 | Ljung et al. | 356/350 |
| 4,242,917 | 1/1981 | Bennett et al. | 74/5.5 |
| 4,309,107 | 1/1982 | McNair et al. | 356/350 |
| 4,321,557 | 3/1982 | McNair | 356/350 X |
| 4,349,183 | 9/1982 | Wirt et al. | 356/350 X |
| 4,407,583 | 10/1983 | Simms | 356/350 |
| 4,425,040 | 1/1984 | Ljung et al. | 356/350 |
| 4,445,779 | 5/1984 | Johnson | 356/350 |

Primary Examiner—Vincent P. McGraw
Assistant Examiner—S. A. Turner
Attorney, Agent, or Firm—R. F. Beers; H. A. David

[57] ABSTRACT

Provides a suspension mount for a gyro sensor block suspension eliminates dither cross-talk in a gyro triad having a set of common gyros with the same dither tuned suspension. A sensor block has three gyro mount locations situated such that, when attached, the gyro triad is mutually orthonogal to each other. Two of the gyro mount locations have a spring suspension, each of a different stiffness, formed by joining a central hub, to which the gyro is attached, with the sensor block mass via a plurality of spokes to form a torsional spring about the gyro dither axis.

2 Claims, 4 Drawing Figures

GYRO SENSOR BLOCK SUSPENSION

BACKGROUND OF THE INVENTION

1. Field of the Invention

The present invention relates to gyro systems, and more particularly to a gyro sensor block suspension to provide a mechanical means of eliminating dither cross-talk in a gyro triad having a set of gyros with the same dither tuned suspension.

2. Background of the Invention

For a gyro triad having mutually orthogonal dither axes and essentially equivalent natural dither frequencies, an unacceptably large amount of power is required to hold the gyro dither frequency. This power is required because the gyros interact with each other, resulting in undesirable beat frequencies which impact upon gyro accuracy. Therefore, a mechanical solution is desired to reduce power consumption. One mechanical approach is to use gyros with different internal dither suspensions. However, as opposed to the use of a common gyro this is an expensive alternative.

SUMMARY OF THE INVENTION

Accordingly, the present inventions provides a suspension mount for a gyro sensor block suspension which eliminates dither cross-talk in a gyro triad having a set of common gyros with the same dither tuned suspension. A sensor block has three gyro mount locations situated such that, when attached, the gyro triad is mutually orthogonal to each other. Two of the gyro mount locations have a spring suspension, each of a different stiffness, formed by joining a central hub, to which the gyro is attached, with the sensor block mass via a plurality of spokes to form a torsional spring about the gyro dither axis.

Therefore, it is an object of the present invention to provide a gyro sensor block suspension which eliminates dither cross-talk in a gyro triad.

Other objects, advantages and novel features will be apparent from the following detailed description when read in conjunction with the appended claims and attached drawing.

DESCRIPTION OF THE PREFERRED EMBODIMENT

Figure 1:
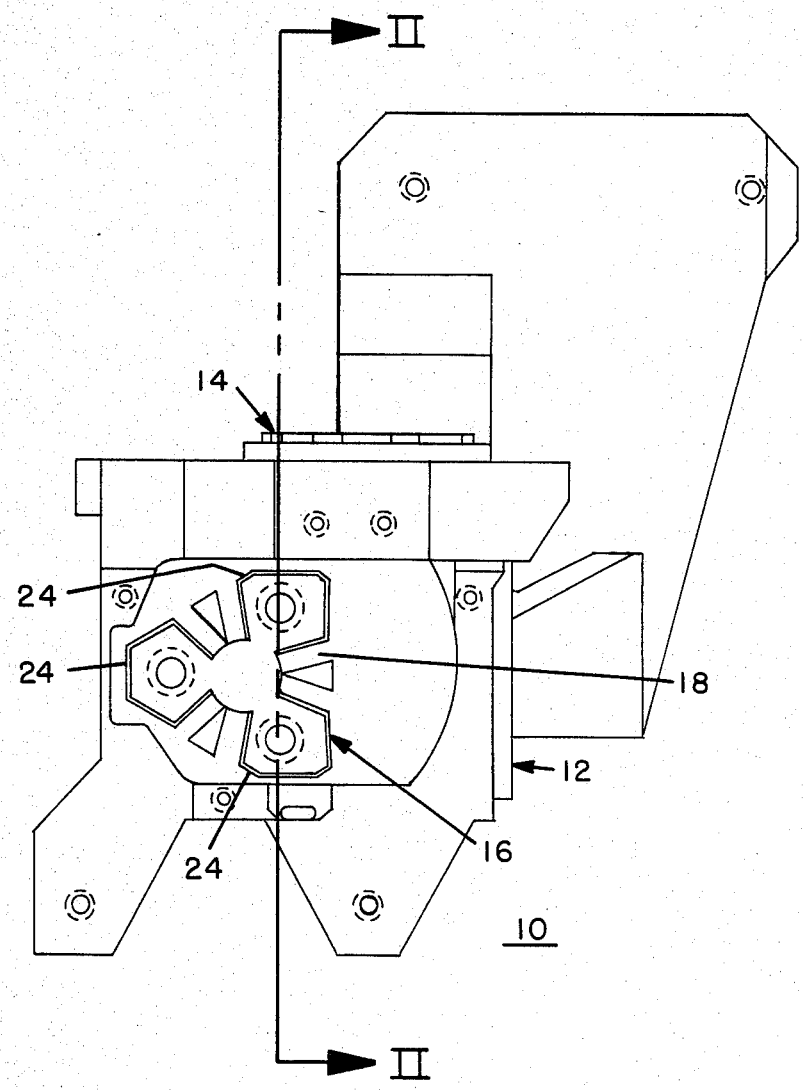
FIG. 1 is a top plan view of a gyro sensor block having a gyro block suspension according to the present invention.
Figure 2:
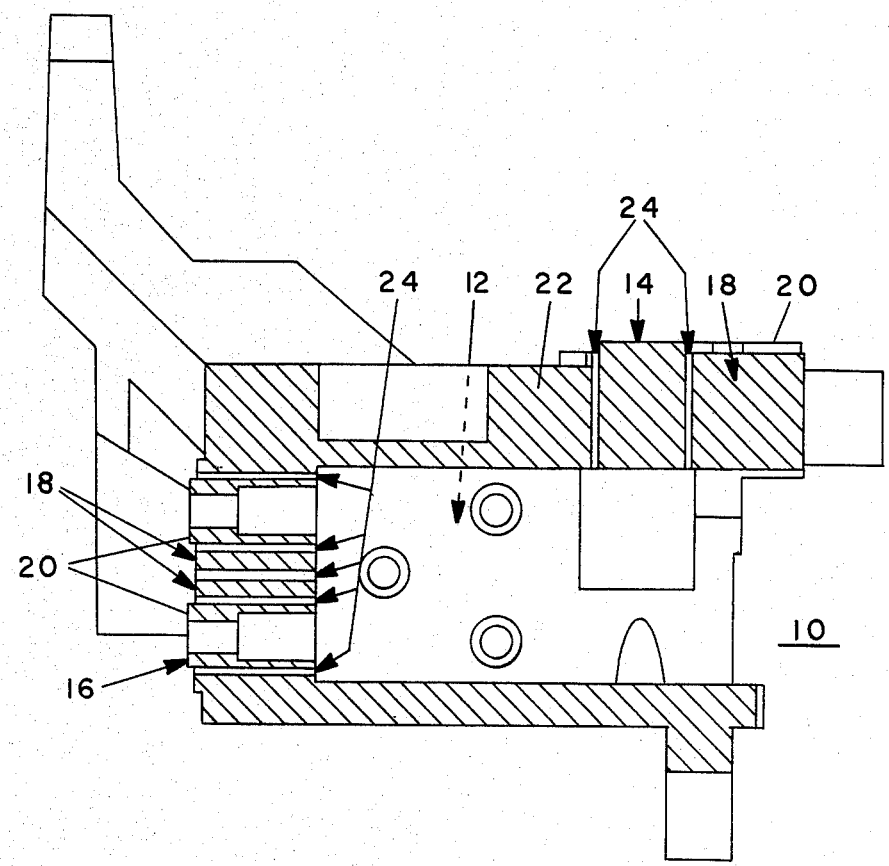
FIG. 2 is a cross-sectional view of the gyro sensor block of FIG. 1 taken along the line II—II.

Referring now to FIGS. 1-4 a gyro sensor block 10 is shown having three gyro mount locations 12, 14, 16 mutually orthogonal to each other. Two of the gyro mount locations 14, 16 have a spring suspension. The spring suspension has a series of spokes 18 integrally joining a central hub 20, to which a gyro is attached, to the main sensor block mass 22. The central hub 20 is separated from the main sensor block mass 22 by a slot 24 except where the spokes 18 join the hub to the sensor block mass. The stiffness of the suspension is determined by the width, length and thickness of the spokes 18 and the shape of the central hub 20.

Figure 3:
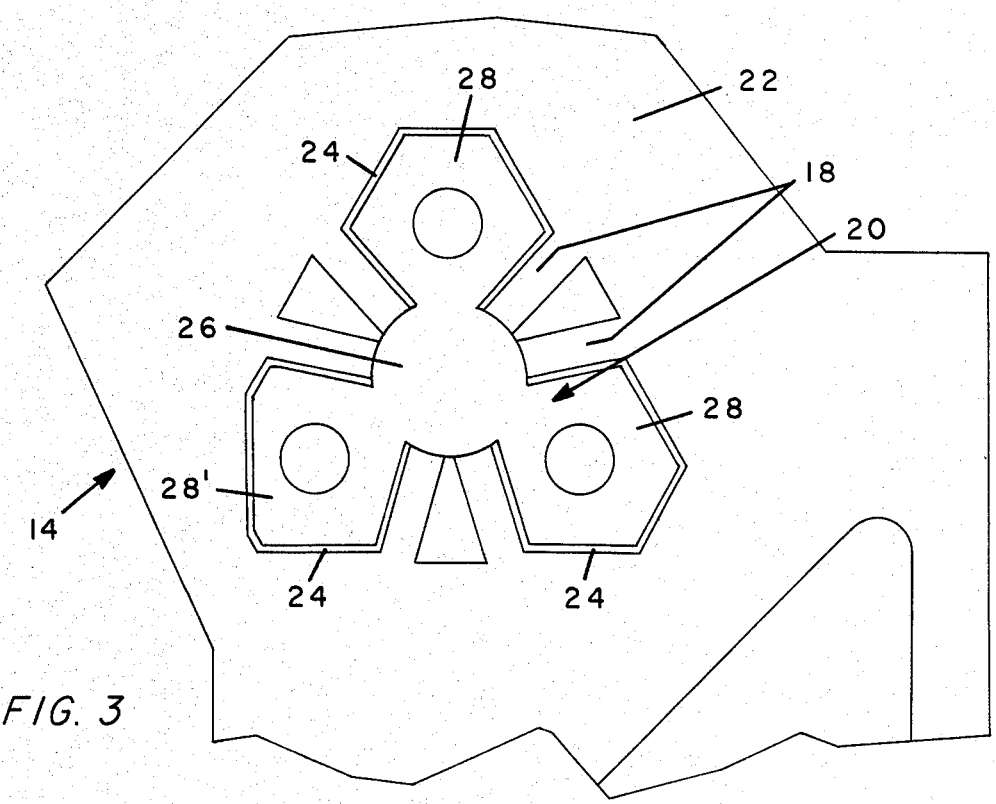
FIG. 3 is a plan view of one spring suspension gyro mount.
Figure 4:
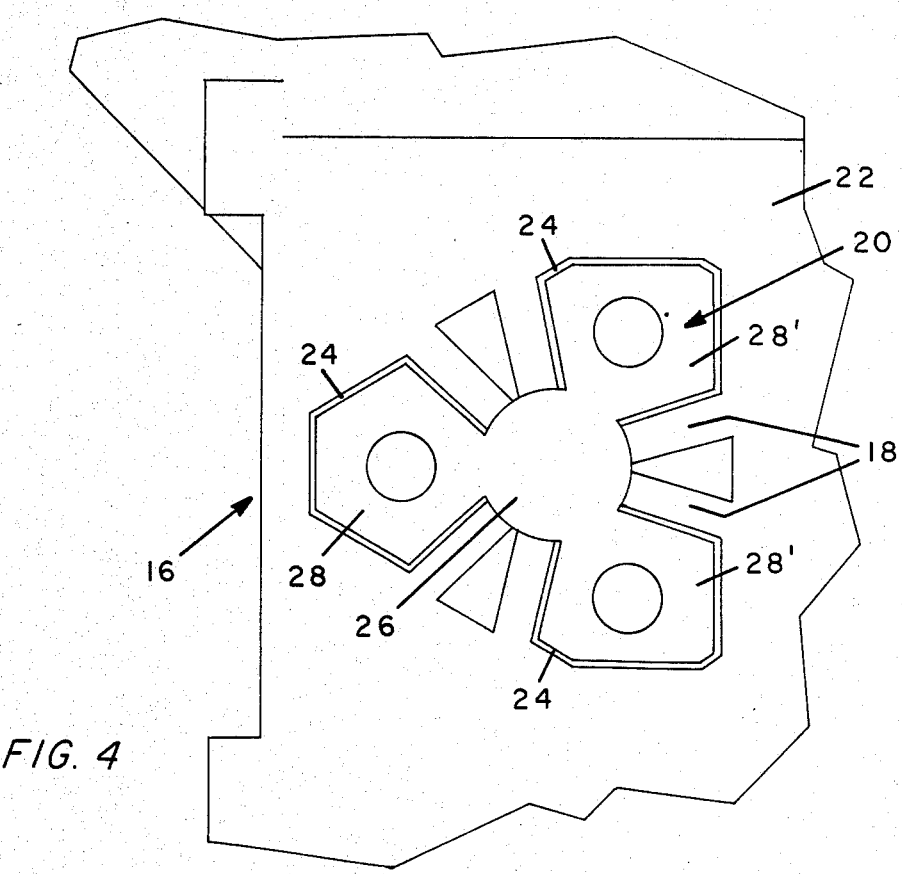
FIG. 4 is a plan view of a second spring suspension gyro mount.

As shown in FIGS. 3 and 4 the central hub 20 has a core 26 to which the spokes 18 are joined and three attachment points 28, 28'. The difference in suspension stiffness at each attachment point 28, 28' is a function of the width, length and thickness and number of spokes 18, and the diameter of the core 26. In the embodiment shown only the thickness of the sets of six spokes 18 is different, the other four parameters being the same at the attachment points 28, 28'.

The suspension may be machined integrally into the sensor block 10 by electrical discharge machining, or it may be a separate piece that is bolted on, welded, brazed or otherwise attached to the sensor block.

Each suspension acts in series with each internal gyro dither suspension to reduce the gyro dither natural frequency so that when three gyros with the same natural dither frequency are mounted on the sensor block 10 the resultant dither natural frequency of each gyro is different from each of the other two gyros. The spokes 18 are sized to be "very stiff" in tension/compression to circumvent additional vibration modes which would cause cross-talk between the gyros, i.e., the torsional stiffness about axes other than the dither axis is at least an order of magnitude greater than that about the dither axis.

Therefore, the present invention provides a gyro sensor block suspension which eliminates dither cross-talk in a gyro triad by having a spring suspension of differing stiffnesses at two of the three gyro locations.

What is claimed is:

1. A gyro sensor block suspension comprising a sensor block having tnree gyro mounts for orthogonally mounting a triad of gyros, said gyros each having the same internal dither tuned suspension, two of said gyro mounts having a spring suspension machined into said sensor block, said spring suspensions being of different stiffnesses so as to act in series with said internal dither tuned suspension to reduce the gyro dither frequency.

2. A suspension as recited in claim 1 wherein said spring suspension comprises:
   a central hub to which one of said gyros is attached; and
   a plurality of spokes integrally connecting said central hub to the main mass of said sensor block such that said spokes form a torsional spring about the dither axis of said one gyro.

* * * * *